(12) United States Patent
Sato et al.

(10) Patent No.: US 10,704,420 B2
(45) Date of Patent: Jul. 7, 2020

(54) TURBINE HOUSING

(71) Applicant: AISIN TAKAOKA CO., LTD., Toyota-shi, Aichi (JP)

(72) Inventors: Akira Sato, Toyota (JP); Satoru Isaji, Toyota (JP)

(73) Assignee: AISIN TAKAOKA CO., LTD., Toyota-Shi, Aichi (JP)

( * ) Notice: Subject to any disclaimer, the term of this patent is extended or adjusted under 35 U.S.C. 154(b) by 0 days.

(21) Appl. No.: 16/182,821

(22) Filed: Nov. 7, 2018

(65) Prior Publication Data

US 2019/0136717 A1 May 9, 2019

(30) Foreign Application Priority Data

Nov. 8, 2017 (JP) ................. 2017-215928

(51) Int. Cl.
    *F01D 25/26* (2006.01)
    *F01D 9/02* (2006.01)
    (Continued)

(52) U.S. Cl.
    CPC ............. *F01D 25/26* (2013.01); *F01D 9/026* (2013.01); *F01D 17/105* (2013.01); *F02C 6/12* (2013.01);
    (Continued)

(58) Field of Classification Search
    CPC ........ F01D 25/24; F01D 25/26; F01D 25/243; F05D 2220/40; F05D 2260/941; F02C 6/12
    (Continued)

(56) References Cited

U.S. PATENT DOCUMENTS

| | | | |
|---|---|---|---|
| 8,257,027 B2 * | 9/2012 | Hoecker | F01D 9/04 415/126 |
| 9,234,459 B2 | 1/2016 | Sadamitsu et al. | |

(Continued)

FOREIGN PATENT DOCUMENTS

| | | |
|---|---|---|
| JP | 2007-278130 A | 10/2007 |
| JP | 2011-144764 A | 7/2011 |

(Continued)

OTHER PUBLICATIONS

The extended European Search Report dated Apr. 29, 2019, by the European Patent Office in corresponding European Patent Application No. 18204959.3-1006. (5 pages).

(Continued)

*Primary Examiner* — Nathaniel E Wiehe
*Assistant Examiner* — Ryan C Clark
(74) *Attorney, Agent, or Firm* — Buchanan, Ingersoll & Rooney PC (57) ABSTRACT

An outer housing 12 formed of a sheet metal is provided such that its open end portion 312 surrounds an outer edge portion 26 of an inner housing 11 formed by casting. An outer protrusion 216, an annular protrusion 227, and a connecting portion 27 are provided on the outer edge portion 26 of the inner housing 11. The open end portion 312 of the outer housing 12 is joined to a protruding end 217 of the outer protrusion 216, a protruding end 228 of the annular protrusion 227, and an end edge 271 of the connecting portion 27, whereby the inner housing 11 and the outer housing 12 are integrated.

5 Claims, 8 Drawing Sheets (51) Int. Cl.
  *F01D 17/10* (2006.01)
  *F02C 6/12* (2006.01)
(52) U.S. Cl.
  CPC ...... *F05D 2220/40* (2013.01); *F05D 2230/54* (2013.01); *F05D 2260/941* (2013.01)
(58) Field of Classification Search
  USPC .............................................. 415/204, 214.1
  See application file for complete search history.

(56) References Cited

U.S. PATENT DOCUMENTS

| | | | | |
|---|---|---|---|---|
| 2009/0094979 | A1* | 4/2009 | Eissler | F01D 3/00 60/602 |
| 2010/0316494 | A1* | 12/2010 | Gru mann | F01D 25/26 415/231 |
| 2011/0083433 | A1* | 4/2011 | Stroph | F01D 9/026 60/605.1 |
| 2012/0294712 | A1 | 11/2012 | Sadamitsu et al. | |
| 2016/0130979 | A1 | 5/2016 | Grussmann | |
| 2018/0245481 | A1* | 8/2018 | Hossbach | F01D 25/243 |
| 2018/0291764 | A1* | 10/2018 | Hossbach | F01D 25/125 |
| 2018/0328226 | A1* | 11/2018 | Yokoshima | F01D 9/026 |

FOREIGN PATENT DOCUMENTS

| | | |
|---|---|---|
| JP | 2015183561 A | 10/2015 |
| JP | 2017-082762 A | 5/2017 |

OTHER PUBLICATIONS

Office Action (Notice of Reasons for Refusal) dated Sep. 17, 2019, by the Japanese Patent Office in corresponding Japanese Patent Application No. 2017-215928 and an English Translation of the Office Action. (6 pages).

Office Action (Notice of Reasons for Refusal) dated Dec. 3, 2019, by the Japanese Patent Office in corresponding Japanese Patent Application No. 2017-215928 and an English Translation of the Office Action. (7 pages).

* cited by examiner

TURBINE HOUSING

CROSS REFERENCE TO RELATED APPLICATION

The present application is based on Japanese Patent Application No. 2017-215928 filed on Nov. 8, 2017, and the entire content described therein is incorporated in the present specification.

BACKGROUND OF THE INVENTION

Field of the Invention

The present disclosure relates to a turbine housing of a turbocharger.

Description of the Related Art

An internal combustion engine of a vehicle or the like in some cases includes a turbocharger provided in its exhaust system. Exhaust gas flowing through the turbocharger rotates a turbine incorporated in the turbocharger so as to supercharge intake air, whereby the performance of the engine is enhanced and low fuel consumption is realized. Conventionally, the turbine housing of the turbocharger is formed as a single member by means of casting.

The conventional turbine housing, which is a cast product, has encountered difficulty in reducing wall thickness so as to reduce its weight and cost. In view of this, a structure of a turbine housing for reducing weight by combined use of a cast part and a sheet metal part has been proposed as disclosed in, for example, Japanese Patent Application Laid-Open (kokai) No. 2015-183561. In this structure, an inner housing having an introduction flow passage and a scroll flow passage is a cast part, and an outer housing for forming a flow passage for exhaust gas flowing out of a turbine chamber is a sheet metal part. The turbine housing is formed by combining the two housings.

In the above-described turbine housing in which the cast inner housing and the sheet metal outer housing are combined together, the two housings are fixed by means of welding. In this case, a plate portion of the outer housing is brought into contact with an outer edge portion of the inner housing which is located radially when viewed in the direction of a scroll center line, and the outer housing is joined to the inner housing, by means of welding or the like, in regions where the plate portion of the outer housing is in contact with the outer edge portion of the inner housing.

Incidentally, since exhaust gas of high temperature immediately after being discharged from the engine flows through the introduction flow passage and the scroll flow passage of the inner housing, the inner housing also has a high surface temperature. Therefore, joints formed in the regions where the inner surface of the plate portion of the outer housing is brought into contact with and joined to the outer edge portion of the inner housing also have increased temperatures. As a result, the stresses acting on the joints between the inner housing and the outer housing increase due to thermal expansion, which may result in generation of a crack.

SUMMARY OF THE INVENTION

The present disclosure has been accomplished under the above-described circumstances, and its main object is to provide a turbine housing which suppresses an increase in the stress acting on a joint between a cast inner housing and a sheet metal outer housing and resultant generation of a crack.

A turbine housing of the present disclosure comprises:

an inner housing formed by casting and including a scroll tube portion which surrounds a turbine chamber for accommodating a turbine impeller and has a scroll flow passage through which a flow exhaust gas to flows circularly and goes out to the turbine chamber, and an introduction tube portion which leads an inflow exhaust gas to the scroll flow passage, and an outlet passage portion through which the flow exhaust gas flows out of the turbine chamber flows; and an outer housing formed of a sheet metal and including an open end portion which surrounds an outer edge portion of the inner housing when viewed in a direction of a scroll center line and an exhaust outlet which is provided on a side opposite the open end portion and through which the flow exhaust gas flowing out of the outlet passage portion is discharged, wherein the inner housing has a protrusion protruding outward from the outer edge portion of the inner housing, and a protruding end of the protrusion and the open end portion of the outer housing are joined to each other, whereby the outer housing and the inner housing are integrated.

In the turbine housing of the present disclosure, even when the surface temperature of the inner housing increases as a result of a hot flow exhaust gas flowing through the introduction flow passage and the scroll flow passage, the heat of the inner housing is radiated from the outside surface of the protrusion before being transferred to the joint between the inner housing and the outer housing. This heat radiation effect suppresses an excessive temperature increase at the joint, thereby suppressing an increase in the stresses acting on the joint and resultant generation of a crack.

In the turbine housing of the present disclosure, preferably, the scroll flow passage has a flow passage inlet through which the flow exhaust gas flows into the scroll flow passage, and a flow passage outlet through which the flow exhaust gas flows out of the scroll flow passage, and a merging point in which the flow exhaust gas flowing out of the scroll flow passage through the flow passage outlet merges with the flow exhaust gas flowing into the scroll flow passage through the flow passage inlet; and a protruding length of the protrusion is larger at the merging portion than that at the remaining portion of the outer edge portion.

The merging portion of the scroll flow passage of the inner housing receives the influence of the hot flow exhaust gas and has the highest surface temperature in the inner housing. In the above-described turbine housing, the protrusion provided on the outer edge portion of the merging portion exhibits a sufficient heat radiation effect, thereby appropriately suppressing an excessive temperature increase at the joint between the inner housing and the outer housing.

In the turbine housing of the present disclosure, preferably, the protruding length of the protrusion gradually decreases from the merging portion toward a downstream side of the scroll flow passage.

In a portion of the inner housing, which portion extends from the merging portion of the scroll flow passage toward the downstream side, the surface temperature decreases toward the downstream side because the flow exhaust gas gradually flows out into the turbine chamber. Therefore, even when the protruding length of the protrusion for obtaining the heat radiation effect is set to be short, an excessive temperature increase at the joint between the inner housing and the outer housing can be suppressed. In addition, since the protruding length is rendered short, increases in the size and weight of the inner housing can be suppressed. According, in the above-described turbine housing, the protruding length of the protrusion is adjusted in accordance with the surface temperature distribution of the inner housing along the scroll flow passage, so that it is possible to suppress increases in the size and weight of the inner housing while achieving a sufficient heat radiation effect.

In the turbine housing of the present disclosure, preferably, when viewed in the direction of the scroll center line, the introduction tube portion has a first introduction outer edge portion located near a downstream portion of the scroll tube portion, and a second introduction outer edge portion located on a side opposite of the first introduction outer edge portion across an introduction flow passage inside the introduction tube portion; and the protrusion provided on the first introduction outer edge portion and the protrusion provided on the downstream portion of the scroll tube portion are integrated together to provide a flat-plate-shaped connecting portion which connect the introduction tube portion and the downstream portion of the scroll tube portion.

In the above-described turbine housing, the protrusions provided at outer edge portions located close to each other are integrated so as to form a flat-plate-shaped connecting portion, whereby the surface area of the protrusion is increased, and thus the heat radiation effect is enhanced. In particular, at the downstream portion of the scroll flow passage, the surface temperature of the inner housing increases toward the merging portion. Therefore, the enhancement of the heat radiation effect is appropriate for suppression of an excessive temperature increase at the joint between the inner housing and the outer housing. Also, since the inner housing is formed by casting, the protrusions provided at the outer edge portions located close to each other can be integrated so as to form a flat-plate-shaped connecting portion, so that no gap is formed between the outer edge portions located close to each other. Therefore, the inner housing can be easily cast.

In the turbine housing of the present disclosure, preferably, the protruding length of the protrusion provided on the second introduction outer edge portion increases from an inlet-side end portion of the introduction tube portion toward the downstream side.

The turbine housing may be attached to the cylinder head of an internal combustion engine, which is water-cooled to a temperature sufficiently lower than the temperature of an exhaust gas. In such a case, since the temperature of the turbine housing at the attaching portion is low, the surface temperature of the inner housing increases from the inlet-side end portion of the introduction tube portion toward the downstream side. In such a case, in the above-described turbine housing, the protrusion provided on the outer edge portion of the introduction tube portion is formed such that its protruding length increases as the temperature increases. Therefore, a sufficient heat radiation effect can be attained. Also, since the protrusion is formed such that the protruding length becomes small at the inlet-side end portion which is low in temperature, the protruding length of the protrusion is adjusted in accordance with the temperature distribution, so that it is possible to suppress increases in the size and weight of the inner housing while achieving a sufficient heat radiation effect.

In the turbine housing of the present disclosure, preferably, an inlet-side end portion of the introduction tube portion has an outer circumferential protrusion which protrudes from an outer circumferential portion of the inlet-side end portion, the outer circumferential portion extending in a circumferential direction; the outer housing has a contact portion which contacts a protruding end of the outer circumferential protrusion; and the protruding end of the outer circumferential protrusion and the contact portion are joined to each other.

The turbine housing may be attached to an exhaust manifold which has high temperature due to influence of an exhaust gas. In such a case, since the temperature of the turbine housing at the attaching portion is also high, the surface temperature of the inner housing is already high at the inlet-side end portion of the introduction tube portion. In such a case, in the above-described turbine housing, not only the protrusion provided on the outer edge portion of the introduction tube portion but also the outer circumferential protrusion exhibits the heat radiation effect. As a result, in the case where the turbine housing is attached to the above-described member (i.e., the exhaust manifold), an excessive temperature increases is suppressed even at the outer circumferential portion of the inlet-side end portion of the introduction tube portion, whereby an increase in the stress acting on that portion and resultant generation of a crack can be suppressed.

The object described above and other objects, features, and advantages of the present disclosure will be apparent from the following detailed description with reference to the accompanying drawings.

DETAILED DESCRIPTION OF THE PREFERRED EMBODIMENT

One embodiment in which the present disclosure is embodied will now be described with reference to the drawings. In the present embodiment, the present disclosure is embodied as a turbine housing used for a turbocharger for an automobile.

Figure 1:
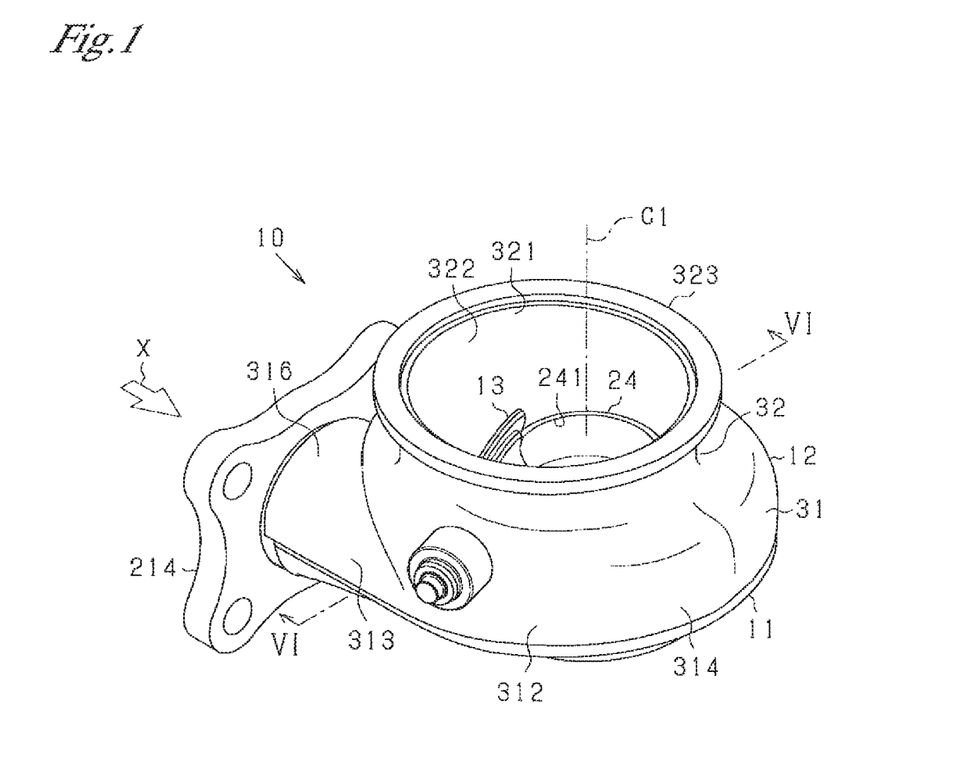
FIG. 1 is a perspective view of a turbine housing.
Figure 2:
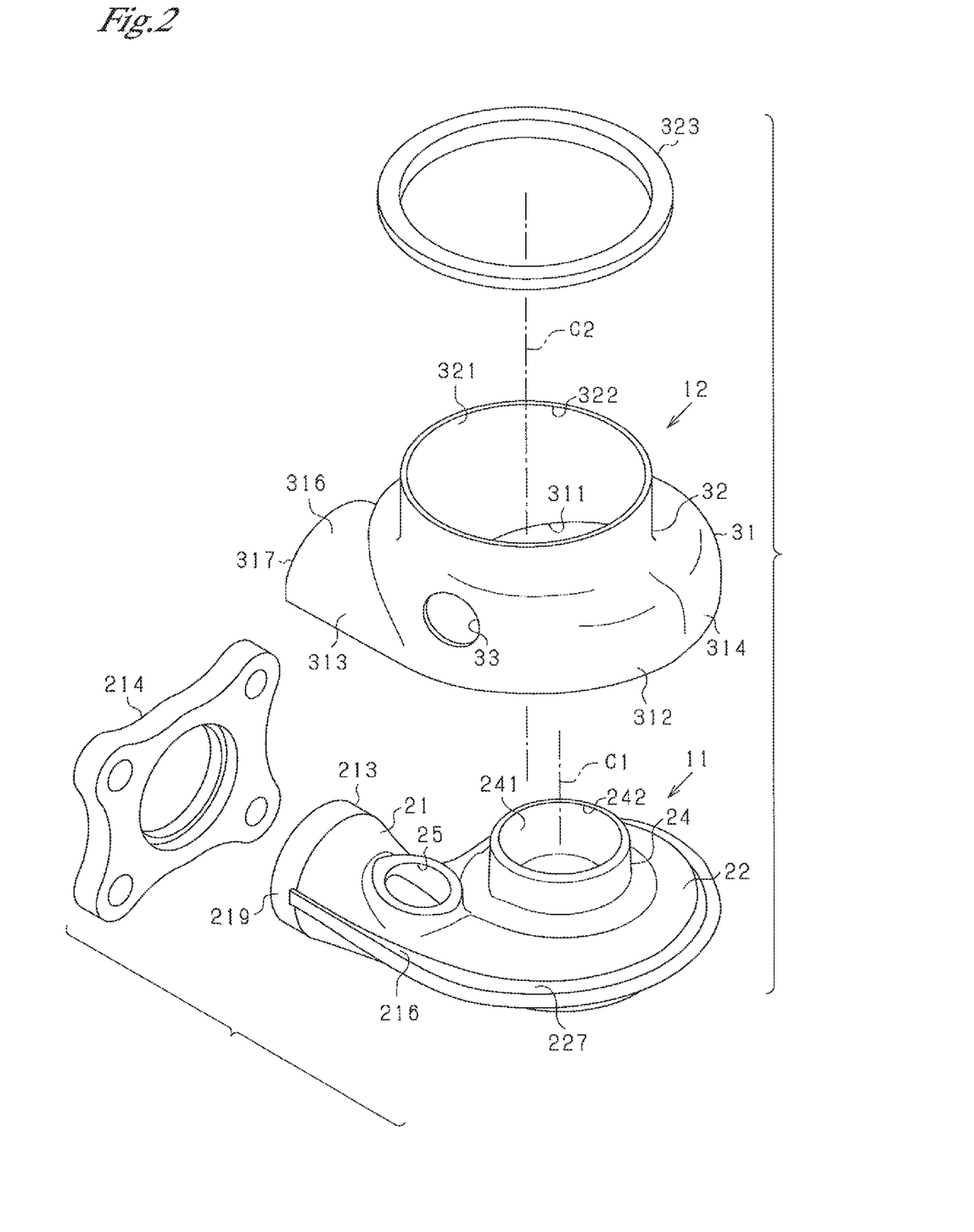
FIG. 2 is an exploded perspective view of the turbine housing.

As shown in FIGS. 1 and 2, a turbine housing 10 of the present embodiment includes an inner housing 11 and an outer housing 12. The inner housing 11 is formed by casting, and the outer housing 12 is formed of a sheet metal. The turbine housing 10 is constituted by combining the inner housing 11 and the outer housing 12.

Figure 3:
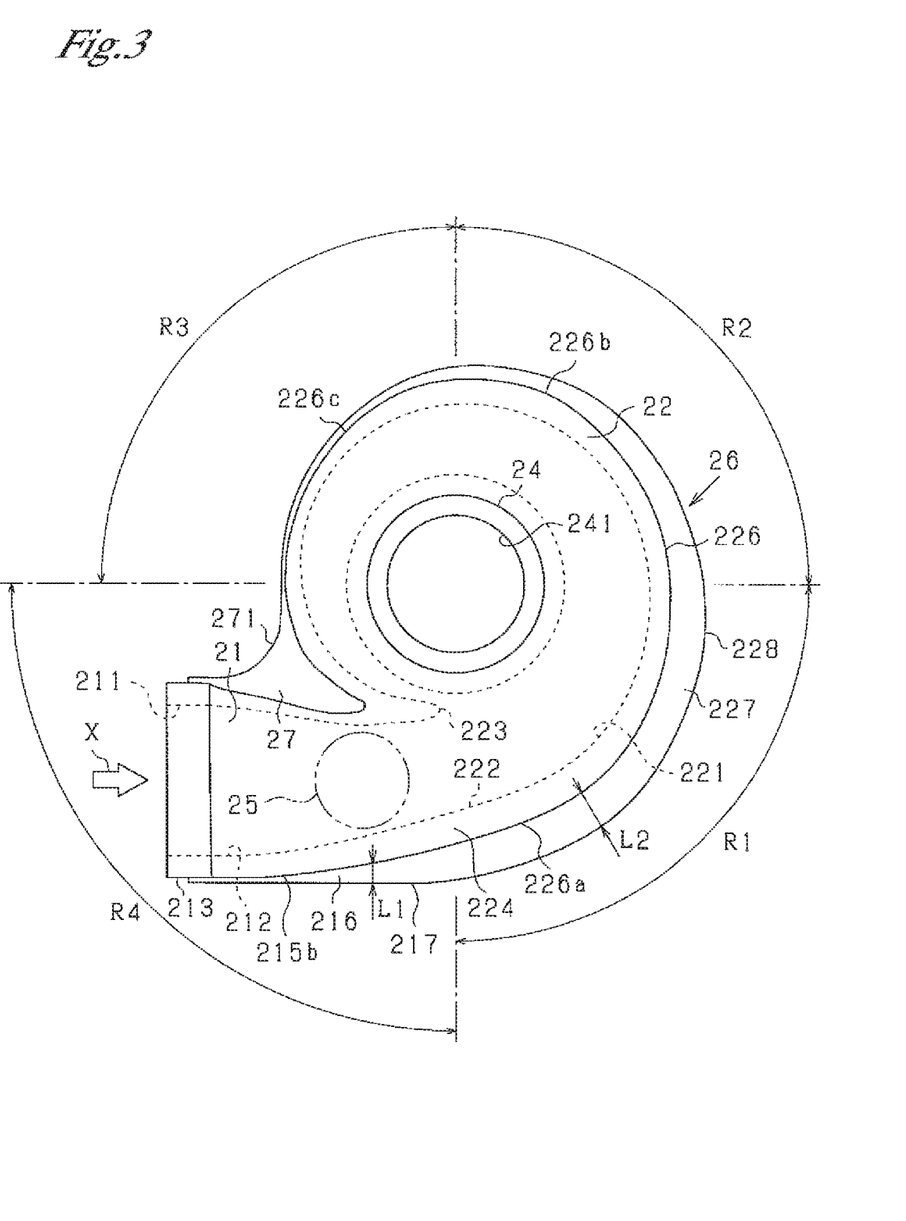
FIG. 3 is a plan view of an inner housing.
Figure 6:
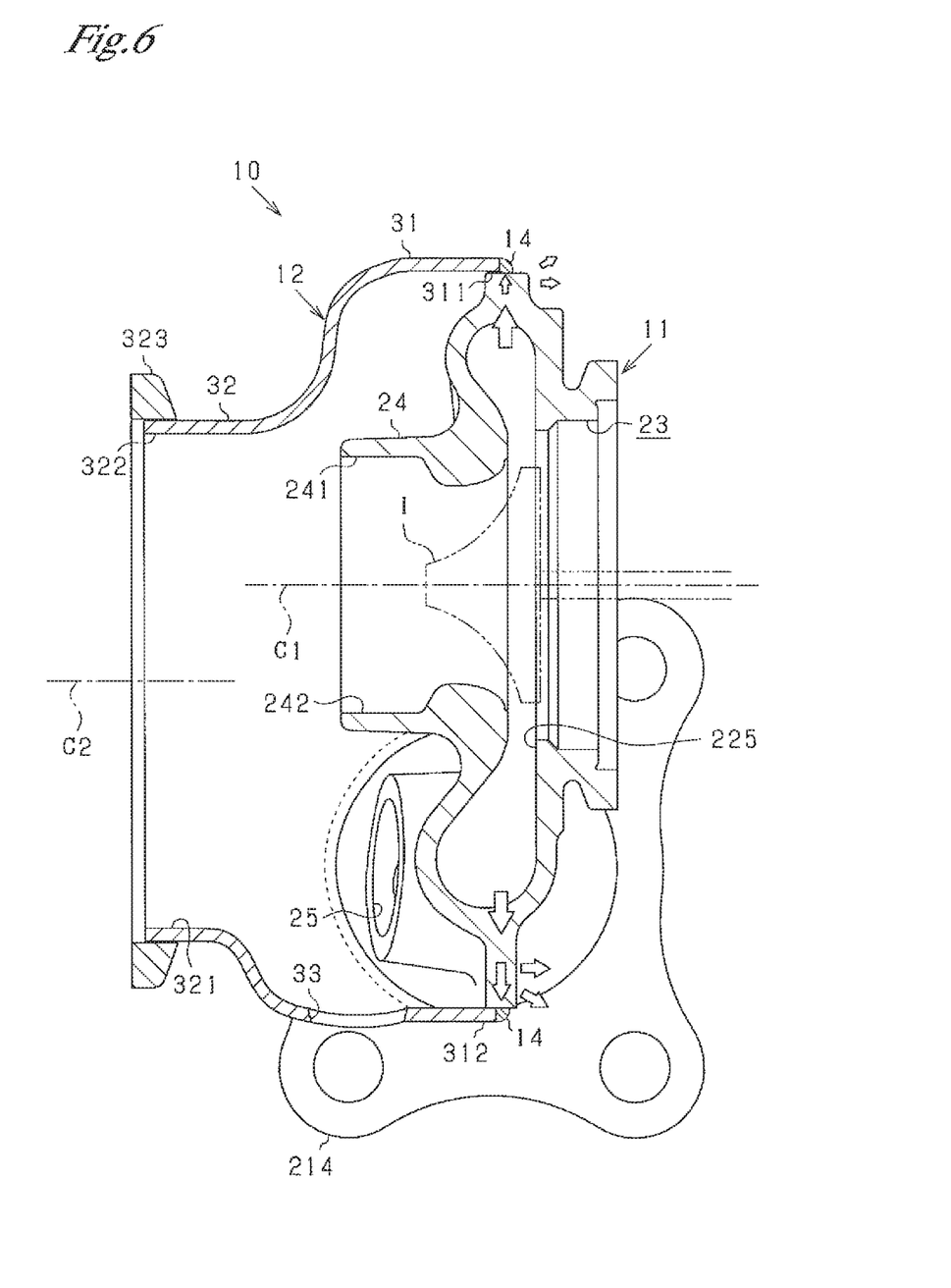
FIG. 6 is a sectional view taken along line VI-VI in FIG. 1.

As shown in FIGS. 2 and 3, the inner housing 11 has a generally spiral outer shape as a whole. The inner housing 11 is seamlessly formed as a single member by casting cast iron or cast steel which have high heat resistance. Referring to FIG. 6 as well as FIGS. 2 and 3, the inner housing 11 has an introduction tube portion 21, a scroll tube portion 22, a turbine chamber 23 (see FIG. 6), and an outlet passage portion 24.

The introduction tube portion 21 is an introduction portion through which an exhaust gas flowing out of an internal combustion engine of an automobile flows immediately after being introduced into the inner housing 11. The introduction tube portion 21 is formed in an approximately cylindrical shape. The introduction tube portion 21 has an exhaust inlet 211 for introducing the exhaust gas and extends in a direction (X-direction) in which the exhaust gas is introduced through the exhaust inlet 211 (hereinafter referred to as the "exhaust gas introduction direction (X-direction)"). As shown in FIG. 3, the introduction tube portion 21 has an introduction flow passage 212 formed therein and extending along the introduction tube portion 21. The introduction flow passage 212 is formed such that the cross sectional area of the flow passage decreases gradually. As shown in FIGS. 1 and 2, an inlet flange 214 is provided at an inlet-side end portion 213 of the introduction tube portion 21 where the exhaust inlet 211 is provided. By using the inlet flange 214, the turbine housing 10 is connected to an upstream-side member such as the exhaust manifold or the cylinder head of the engine.

As shown in FIGS. 2 and 3, the scroll tube portion 22 spirally extends from an end portion of the introduction tube portion 21 opposite the exhaust inlet 211. A scroll center line C1 of the scroll tube portion 22 is approximately orthogonal to the exhaust gas introduction direction (X-direction in which the exhaust gas is introduced through the exhaust inlet 211. As shown in FIG. 3, a scroll flow passage 221 is formed inside the scroll tube portion 22.

The scroll flow passage 221 spirally extends along the shape of the scroll tube portion 22. Its flow passage inlet 222 communicates with the introduction flow passage 212. The scroll flow passage 221 circularly extends about 360 degrees, reaches a flow passage outlet 223, and merges with the flow passage inlet 222. Therefore, a region of the scroll tube portion 22 where the flow passage inlet 222 and the flow passage outlet 223 of the scroll flow passage 221 are provided will be referred to as a "merging portion 224." The cross sectional area of the scroll flow passage 221 gradually decreases from the flow passage inlet 222 toward the downstream side of the flow passage outlet 223. The exhaust gas having passed through the introduction flow passage 212 and flowed into the scroll flow passage 221 through the flow passage inlet 222 circularly flows along the scroll flow passage 221.

The turbine chamber 23 is a space in which a turbine impeller I of the turbocharger is accommodated. As shown in FIG. 6, the turbine chamber 23 is provided at a scroll center portion of the scroll tube portion 22. Therefore, the scroll tube portion 22 is provided on the outer circumferential side of the turbine chamber 23 to form an annular shape. The turbine chamber 23 has an opening which is open toward one side in the direction in which the scroll center line C1 extends (hereinafter simply referred to as the "direction of the scroll center line C1"). The turbine impeller I is accommodated in the turbine chamber 23 through the opening. The scroll center line C1 is also the center line of the turbine chamber 23.

An annular communication space 225 is provided on the inner circumferential side of the scroll tube portion 22. Through the annular communication space 225, the turbine chamber 23 communicates with an inner-circumferential-side portion of the scroll flow passage 221 over the entire circumference thereof. Therefore, while the exhaust gas circularly flows through the scroll flow passage 221, a portion of the exhaust gas gradually flows out to the turbine chamber 23 through the annular communication space 225.

As shown in FIGS. 2 and 6, the outlet passage portion 24 is provided at the scroll center portion of the scroll tube portion 22 such that the outlet passage portion 24 protrudes from the scroll tube portion 22 toward the side opposite the turbine chamber 23 (hereinafter referred to the "counter-turbine side"). The outlet passage portion 24 is formed to have the shape of a tube, and the direction in which the tube extends is parallel to the direction of the scroll center line C1. The outlet passage portion 24 is provided such that its center line coincides with the scroll center line C1. An exhaust flow passage 241 is formed in the tubular outlet passage portion 24. A portion of the exhaust flow passage 241 on one side communicates with the turbine chamber 23 and partially constitutes the turbine chamber 23, and a portion of the exhaust flow passage 241 on the other side is open toward the outside of the housing. The open portion of the exhaust flow passage 241 serves as a passage outlet 242. Therefore, the exhaust gas introduced into the turbine chamber 23 flows through the exhaust flow passage 241 of the outlet passage portion 24 and then flows to the outside of the inner housing 11 through the passage outlet 242.

Accordingly, the exhaust gas introduced into the inner housing 11 from the exhaust inlet 211 flows through the introduction flow passage 212, the scroll flow passage 221, the turbine chamber 23, and the exhaust flow passage 241, and flows to the outside of the inner housing 11 through the passage outlet 242. In the middle of this flow, the exhaust gas collides with the turbine impeller I accommodated in the turbine chamber 23, so that the turbine impeller I rotates.

As shown in FIG. 2, the inner housing 11 has a bypass outlet 25 provided on the outlet side of the introduction tube portion 21. The bypass outlet 25 is open on the side where the outlet passage portion 24 is provided. As shown in FIG. 1, a valve body 13 for opening and closing the bypass outlet 25 is provided at the bypass outlet 25. In the case where the bypass outlet 25 is closed by the valve body 13, as described above, the exhaust gas having flown inward through the exhaust inlet 211 flows from the introduction flow passage 212 to the scroll flow passage 221. Meanwhile, in the case where the bypass outlet 25 is opened, the exhaust gas having flown inward through the exhaust inlet 211 flows through the introduction flow passage 212, and a portion of the exhaust gas having passed through the introduction flow passage 212 flows out from the bypass outlet 25 without flowing into the scroll flow passage 221. Immediately after the engine is started, the exhaust gas is caused to flow out from the bypass outlet 25, whereby a gas purifying catalyst of an exhaust gas purifier on the downstream side can be activated quickly. The valve body 13 is not illustrated in FIGS. 2 and 6.

Figure 4:
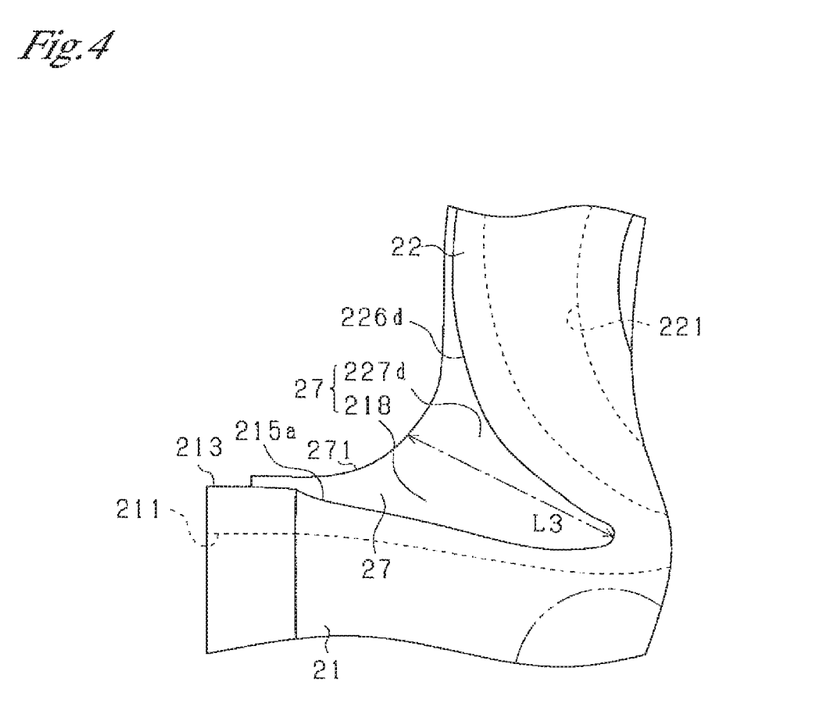
FIG. 4 is a partial enlarged view of a connection portion in FIG. 3.

In the above-described inner housing 11, as shown in FIGS. 3 and 4, an outer protrusion 216, an annular protrusion 227, and a connecting portion 27, which protrude outward, are provided on an entire region of outer edge portion 26 in a plan view as viewed in the direction of the scroll center line. A protruding end 217 of the outer protrusion 216, a protruding end 228 of the annular protrusion 227, and an end edge 271 of the connecting portion 27 define the outer edge of the inner housing 11 in the plan view. The outer protrusion 216, the annular protrusion 227, and the connecting portion 27 correspond to the protrusion in the present disclosure.

The outer protrusion 216 is provided along one of a pair of side portions 215a and 215b of the introduction tube portion 21; specifically, the second side portion 215b on the side opposite the first side portion 215a near the scroll tube portion 22. The outer protrusion 216 has a flat-plate-like shape and protrudes from the second side portion 215b in a direction orthogonal to the scroll center line C1. The outer protrusion 216 is provided along the second side portion 215b to extend from the inlet-side end portion 213 to the merging portion 224. The first side portion 215a corresponds to the first introduction outer edge portion in the present disclosure, and the second side portion 215b corresponds to the second introduction outer edge portion in the present disclosure.

The annular protrusion 227 is provided along an outer circumferential portion 226 of the scroll tube portion 22. The annular protrusion 227 has a flat-plate-like shape and protrudes from the outer circumferential portion 226 in a direction orthogonal to the scroll center line C1. For convenience of description, as shown in FIG. 3, four 90-degree sections of the scroll flow passage 221, which circularly extends about 360 degrees from the flow passage inlet 222 to the flow passage outlet 223, will be referred to as a first section R1, a second section R2, a third section R3, and a fourth section R4, respectively. The start point of the first section R1 and the end point of the fourth section R4 correspond to the merging portion 224. The annular protrusion 227 extends from the start point (the merging portion 224) of the first section R1 to the end point of the third section R3; i.e., is provided over the entire regions of outer circumferential portions 226a to 226c. The annular protrusion 227 and the outer protrusion 216 are continuous with each other without interruption.

As shown in FIG. 4, the connecting portion 27 is provided in a region sandwiched between the first side portion 215a of the introduction tube portion 21 and the outer circumferential portion 226d of the fourth section R4 of the scroll tube portion 22. The first side portion 215a and the outer circumferential portion 226d are located close to each other. The plate-shaped connecting portion 27 extends between the first side portion 215a and the outer circumferential portion 226d of the fourth section R4. The connecting portion 27 is composed of an inner protrusion 218 which protrudes form the first side portion 215a in a direction orthogonal to the scroll center line C1 and an annular protrusion 227d which protrudes from the outer circumferential portion 226d in the same direction. The connecting portion 27 is continuous with the end point of the third section R3 of the annular protrusion 227 without interruption. The connecting portion 27 extends to the inlet-side end portion 213 of the first side portion 215a of the introduction tube portion 21. The fourth section R4 of the scroll tube portion 22 corresponds to "the downstream portion of the scroll tube portion" in the present disclosure.

Next, the outer housing 12 will be described. As shown in FIGS. 1 and 2, the outer housing 12 is provided on the counter-turbine side of the inner housing 11 and is integrated with the inner housing 11.

As shown in FIGS. 2 and 6, the outer housing 12 is formed to have a generally tubular shape as a whole. The outer housing 12 is formed from a sheet of metal, such as stainless steel, which has high heat resistance. Specifically, the outer housing 12 is seamlessly formed, as a single member, by performing machining such as bending on the sheet of metal. As shown in FIGS. 1, 2, and 6, the outer housing 12 has a housing-side tube portion 31 and an outlet-side tube portion 32. The housing-side tube portion 31 is provided on the side toward the inner housing 11 with respect to the direction in which the outer housing 12 extends. A portion of the outer housing 12 on the side opposite the housing-side tube portion 31 is the outlet-side tube portion 32.

The housing-side tube portion 31 is a portion which surrounds and accommodates a counter-turbine-side portion of the inner housing 11. As shown in FIG. 6, the housing-side tube portion 31 has an opening 311 on the side opposite the outlet-side tube portion 32. The counter-turbine-side portion of the inner housing 11 is fitted into the opening 311 such that the turbine-side portion of the inner housing 11 is located outside the opening 311. The outlet passage portion 24 and the bypass outlet 25 are also accommodated in the housing-side tube portion 31.

Figure 5:
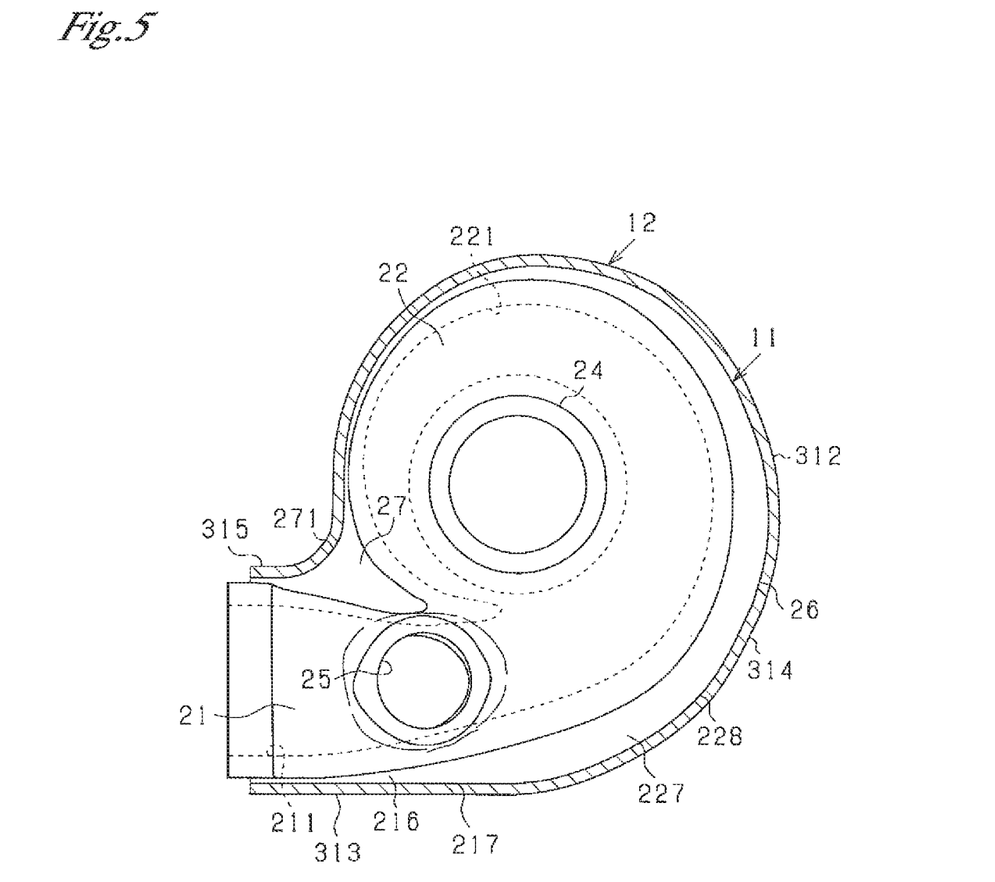
FIG. 5 is a plan view showing a state in which an open end portion of an outer housing is in contact with an outer edge portion of the inner housing, with a portion of the outer housing being cut away.

As shown in FIGS. 1 and 5, an open end portion 312 which defines the opening 311 is in contact with the outer edge portion 26 of the inner housing 11. The open end portion 312 has a first contact portion 313 in contact with the protruding end 217 of the outer protrusion 216, a second contact portion 314 in contact with the protruding end 228 of the annular protrusion 227, and a third contact portion 315 in contact with the end edge 271 of the connecting portion 27.

As shown in FIG. 2, an introduction-side covering portion 316 which covers the introduction tube portion 21 is provided between the first contact portion 313 and the third contact portion 315. As shown in FIGS. 1 and 2, the introduction-side covering portion 316 is formed into the shape of a barrel vault and has an approximately semicircular cross section when viewed in the exhaust introduction direction (X-direction). The introduction-side covering portion 316 is formed to protrude outward from the housing-side tube portion 31 when viewed in the exhaust introduction direction (X-direction). A protruding end portion 317 of the introduction-side covering portion 316 is in contact with an outer circumferential portion 219 of the inlet-side end portion 213 of the introduction tube portion 21, the outer circumferential portion 219 extending in the circumferential direction around the inlet. Thus, the introduction-side covering portion 316 covers the introduction tube portion 21.

As shown in FIG. 6, these contact portions are joined to the inner housing 11 by means of welding, whereby welds 14 are provided at the joined portions. As a result of the welding for joining, the inner housing 11 and the outer housing 12 are integrated while all gaps at the joints are closed.

The housing-side tube portion 31 has a bush hole 33. A bush which is a part of a rotation mechanism which rotates the valve body 13 for opening and closing the bypass outlet 25 of the inner housing 11 is disposed in the bush hole 33.

As shown in FIGS. 2 and 6, the outlet-side tube portion 32 is formed to have an approximately cylindrical shape, and its center line C2 is parallel to the scroll center line C1 of the inner housing 11. An outlet flow passage 321 communicating with the space inside the housing-side tube portion 31 is formed in the space inside the outlet-side tube portion 32. Therefore, the exhaust gas flowing out of the passage outlet 242 of the outlet passage portion 24 or the bypass outlet 25 flows into the outlet flow passage 321 and flows through the outlet flow passage 321. The exhaust gas is then discharged from an opening portion of the outlet-side tube portion 32 on the side opposite the inner housing 11. This opening portion serves as an exhaust outlet 322 of the turbine housing 10. An outlet flange 323 is provided at the exhaust outlet 322. The turbine housing 10 is connected to a downstream-side member such as a catalyst apparatus by using the outlet flange 323.

In the turbine housing 10 of the present embodiment having the above-described configuration, the open end portion 312 of the outer housing 12 is brought into contact with the inner housing 11 at positions different from those in the conventional turbine housing. Namely, the open end portion 312 of the outer housing 12 is not brought into direct contact with the outer surfaces of the introduction tube portion 21 and the scroll tube portion 22. In the present embodiment, the open end portion 312 of the outer housing 12 is brought into contact with the protruding ends 217 and 228 of the outer protrusion 216 and the annular protrusion 227 of the inner housing 11 and the end edge 271 of the connecting portion 27 of the inner housing 11. The open end portion 312 of the outer housing 12 is then welded to the protruding ends 217 and 228 and the end edge 271. Therefore, the joints at which the welds 14 are provided are located at positions spaced from the outer surfaces of the introduction tube portion 21 and the scroll tube portion 22.

In such a configuration, as shown in FIG. 6, even when the temperatures of the outer surfaces of the introduction tube portion 21 and the scroll tube portion 22 increase as a result of the flow of the hot exhaust gas there through, the heat is radiated from the outside surface of the annular protrusion 227 and the connecting portion 27 before being transferred to the joints. This heat radiation effect suppresses an excessive increase in the temperature of each joint, thereby suppressing an increase in the stresses acting on the joint and resultant generation of a crack.

In addition, in the turbine housing 10 of the present embodiment, the outer protrusion 216, the annular protrusion 227, and the connecting portion 27 have different protruding lengths L1 to L3 determined in accordance with their positions. This is because the temperature distributions of the introduction tube portion 21 and the scroll tube portion 22 in a state in which the exhaust gas flows there through differ from each other. Therefore, the protruding lengths L1 to L3 are set in consideration of the temperature distributions. Although increasing the protruding lengths L1 to L3 is preferred in order to obtain a higher heat radiation effect, the presence of the outer protrusion 216, the annular protrusion 227, and the connecting portion 27 leads to an increase in the size of the turbine housing 10 and an increase in the weight of the turbine housing 10. Therefore, from the viewpoint of the balance between the heat radiation effect and the increases in the size and weight, in regions of the introduction tube portion 21 and the scroll tube portion 22 where temperature is relatively low, the protruding lengths L1 to L3 are set to be short (such that the protruding amount becomes small). Also, in regions where temperature is relatively high, the protruding lengths L1 to L3 are set to be long (such that the protruding amount becomes large).

Now, the protruding lengths L1 to L3 of the outer protrusion 216, the annular protrusion 227, and the connecting portion 27 will be described more specifically. Here, the protruding length L1 of the outer protrusion 216 means its protruding length in a direction orthogonal to the exhaust gas introduction direction (X-direction) in the case where the inner housing 11 is viewed in the direction of the scroll center line C1 (state shown in FIG. 3). The protruding length L2 of the annular protrusion 227 means a length by which the annular protrusion 227 protrudes in the radial direction. Also, as shown in FIG. 4, the protruding length L3 of the connecting portion 27 corresponds to the smallest distance between the end edge 271 of the connecting portion 27 and the boundary between the first side portion 215a of the introduction tube portion 21 and the outer circumferential portion 226d of the fourth section R4 of the scroll tube portion 22.

In the turbine housing 10 of the present embodiment is assumed to be attached to the cylinder head of the engine by using the inlet flange 214. Since the cylinder head is water-cooled during operation of the engine, an increase in the temperature of the cylinder head is suppressed. As a result, an increase in the temperature of the inlet-side end portion 213 of the introduction tube portion 21 is also suppressed, and the temperature of the inlet-side end portion 213 is sufficiently low as compared with the temperature of the exhaust gas. The turbine housing 10 has a temperature distribution as described below.

Figure 7:
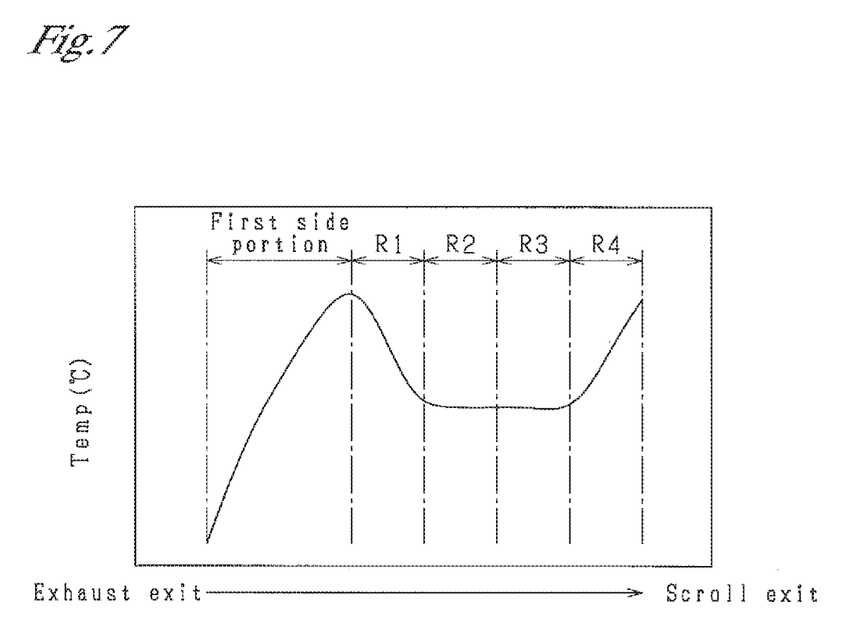
FIG. 7 is a graph showing a temperature distribution in the inner housing.

Namely, as shown in FIG. 7, the temperature is the lowest at the inlet-side end portion 213 of the introduction tube portion 21 which is attached to the cylinder head. This is because the inlet-side end portion 213 receives the influence of the temperature of the cylinder head to which the inlet-side end portion 213 is attached, and the temperature of the inlet-side end portion 213 is also sufficiently low as compared with the temperature of the exhaust gas. The temperature gradually increases from the inlet-side end portion 213 toward the downstream side of the introduction tube portion 21 due to the influence of the hot exhaust gas flowing through the introduction flow passage 212. The temperature reaches a peak at the merging portion 224 which corresponds to a downstream end portion of the introduction tube portion 21 and an upstream end portion of the scroll tube portion 22 (the start point of the first section R1).

Subsequently, while the exhaust gas flows through the scroll flow passage 221 toward the downstream side of the scroll tube portion 22, a portion of the exhaust gas flows out to the turbine chamber 23, so that the influence of the temperature of the exhaust gas on the scroll tube portion 22 becomes smaller. Therefore, the temperature of the scroll tube portion 22 gradually decreases up to the end point of the third section R3.

Since the fourth section R4 is close to a downstream side portion of the introduction tube portion 21 having an increased temperature, the fourth section R4 is likely to receive the influence of the temperature increase. Also, the end point of the fourth section R4 corresponds to the merging portion 224. Therefore, in the fourth section R4, the temperature increases again from the start point to the end point thereof, and the temperature again reaches a peak at the merging portion 224 corresponding to the end point.

In consideration of such a temperature distribution, the protruding length L1 of the outer protrusion 216 is set such that the protruding length L1 becomes the shortest (the protruding amount becomes the smallest) in the outer protrusion 216 at the upstream end at which the inlet-side end portion 213 is provided. The protruding length L1 at the upstream end is preferably set to, for example, 2 mm or less. The protruding length L1 of the outer protrusion 216 is set to gradually increase (becomes larger) from the upstream end toward the downstream side of the introduction tube portion 21. The protruding length L1 of the outer protrusion 216 is set such that the protruding length L1 becomes the longest (the protruding amount becomes the largest) in the outer protrusion 216 at the downstream end of the introduction tube portion 21. The protruding length L1 at the downstream end is preferably set to, for example, 5 to 20 mm.

The protruding length L2 of the annular protrusion 227 is set such that the protruding length L2 at the upstream end of the scroll tube portion 22 is equal to the protruding length L1 of the outer protrusion 216 at the downstream end thereof. The protruding length L2 of the annular protrusion 227 is set such that the protruding length L2 gradually decreases up to the end point of the third section R3 and becomes the shortest (the protruding amount becomes the smallest) at the end point of the third section R3. The protruding length L2 at the end point of the first section R1 (i.e., at the start point of the second section R2) is preferably set to, for example, 4 to 15 mm. The protruding length L2 at the end point of the second section R2 (i.e., at the start point of the third section R3) is preferably set to, for example, 2 to 10 mm. The protruding length L2 at the end point of the third section R3 (i.e., at the start point of the fourth section R4) is preferably set to, for example, 10 mm or less.

The protruding length L3 of the connecting portion 27 is set such that the protruding length L3 at the upstream end of the connection portion 27 is equal to the protruding length L2 of the annular protrusion 227 at the downstream end thereof. Also, at the first side portion 215a of the introduction tube portion 21, the protruding length L3 is set such that the protruding length L3 becomes the shortest (the protruding amount becomes the smallest) in the connection protrusion 27 at the upstream end at which the inlet-side end portion 213 is provided. The protruding length L3 at the upstream end is preferably set to, for example, 2 mm or less. The protruding length L3 from the end point of the fourth section R4 of the scroll tube portion 22 (i.e., the merging portion 224) is set to become the longest (the protruding amount becomes the largest) in the connecting portion 27. The protruding length L3 from the end point of the fourth section R4 is preferably set to, for example, 5 to 40 mm.

As described above, in the turbine housing 10, the protruding lengths L1 to L3 of the outer protrusion 216, the annular protrusion 227, and the connecting portion 27 of the inner housing 11 are set such that these protrusions have different lengths (different protruding amounts) determined in accordance with the temperature distributions of the portions where the protrusions are provided. As a result, it is possible to suppress increases in the size and weight of the turbine housing 10 while obtaining the heat radiation effect by the outer protrusion 216, the annular protrusion 227, and the connecting portion 27.

The turbine housing 10 of the present embodiment having been described in detail achieves the following actions and effects.

(1) The outer protrusion 216, the annular protrusion 227, and the connecting portion 27 are provided on the outer edge portion 26 of the inner housing 11, and the open end portion 312 of the outer housing 12 is joined to the protruding ends 217 and 228 of the outer protrusion 216 and the annular protrusion 227 and the end edge 271 of the connecting portion 27. Therefore, even when the surface temperatures of the introduction tube portion 21 and the scroll tube portion 22 increase as a result of the hot flow exhaust gas flowing there through, before the heat of the inner housing 11 is transferred to the joints between the outer housing 12 and the inner housing 11, the heat is radiated from the outside surface of the protrusions 216 and 227 and the connecting portion 27. By virtue of this heat radiation effect, an excessive temperature increase at each joint can be suppressed. Therefore, an increase in the stress acting on each joint and resultant generation of a crack can be suppressed.

(2) The merging portion 224 of the scroll tube portion 22 receives the influence of the hot flow exhaust gas and has the highest surface temperature in the inner housing 11. The outer protrusion 216 and the annular protrusion 227 are formed such that their protruding lengths L1 and L2 become the longest at the downstream end portion of the introduction tube portion 21 (the upstream end portion of the scroll tube portion 22) which corresponds to the outer edge portion 26 of the merging portion 224. Therefore, at the merging portion 224, a sufficient heat radiation effect is provided by the outer protrusion 216 and the annular protrusion 227, whereby an excessive temperature increase at the joint between the inner housing 11 and the outer housing 12 is adequately suppressed.

(3) In the scroll tube portion 22, the surface temperature decreases from the merging portion 224 toward the downstream side. Therefore, even when the annular protrusion 227 is formed such that the protruding length L2 of the annular protrusion 227 becomes shorter, an excessive temperature increase at the joint between the inner housing 11 and the outer housing 12 can be suppressed. Meanwhile, the shortened protruding length L2 suppresses increases in the size and weight of the inner housing 11. Accordingly, the protruding length L2 of the annular protrusion 227 is adjusted in accordance with the surface temperature distribution along the scroll tube portion 22, so that it is possible to suppress increases in the size and weight of the inner housing 11 while achieving a sufficient heat radiation effect.

(4) The connecting portion 27 having a flat-plate-like shape is provided between the first side portion 215a of the introduction tube portion 21 and the outer circumferential portion 226d of the fourth section R4 of the scroll tube portion 22. As compared with the case where the inner protrusion 218 protruding from the first side portion 215a and the annular protrusion 227d protruding from the outer circumferential portion 226d are formed individually, the connecting portion 27 has a larger surface area because the connecting portion 27 is formed by integrating the inner protrusion 218 and the annular protrusion 227d. Thus, the heat radiation effect is enhanced. In particular, in the fourth section R4 of the scroll tube portion 22, the surface temperature increases toward the merging portion 224. Therefore, the enhancement of the heat radiation effect is appropriate for suppression of an excessive temperature increase at the joint between the inner housing 11 and the outer housing 12. Also, since the inner housing 11 is formed by casting, the protrusions provided at the first side portion 215a and the outer circumferential portion 226d can be integrated so as to form the flat-plate-shaped connecting portion 27, so that no gap is formed between the first side portion 215a and the outer circumferential portion 226d. Therefore, the inner housing 11 can be easily cast.

(5) Since the turbine housing 10 is attached to the cylinder head, the temperature of the introduction tube portion 21 increases from the inlet-side end portion 213 toward the downstream side. The outer protrusion 216 provided at the introduction tube portion 21 is formed such that its protruding length L1 increases toward the downstream side. Therefore, as the temperature of the introduction tube portion 21 increases, the degree of the heat radiation effect increases. Also, the outer protrusion 216 is formed such that the protruding length L1 becomes short at the inlet-side end portion 213 having a low temperature. Accordingly, the protruding length L1 of the outer protrusion 216 is adjusted in accordance with the temperature distribution, so that it is possible to suppress increases in the size and weight of the inner housing 11 while achieving a sufficient heat radiation effect.

The configuration of the turbine housing 10 is not limited to the configuration of the above-described embodiment and the turbine housing of the present disclosure may be embodied as follows.

(a) In the above-described embodiment, the outer protrusion 216 is formed such that the protruding length L1 of the outer protrusion 216 gradually increases from the inlet-side end portion 213 of the introduction tube portion 21 toward the downstream side. Instead of this configuration, the outer protrusion 216 may be formed such that the protruding length L1 is maintained constant over the entire outer protrusion 216. Alternatively, the outer protrusion 216 may be formed such that the protruding length L1 changes among a plurality of different lengths instead of being increased gradually or maintained constant.

(b) In the above-described embodiment, the outer protrusion 216 is formed such that the protruding length L1 of the outer protrusion 216 becomes the shortest at the inlet-side end portion 213 of the introduction tube portion 21. Instead of this configuration, the outer protrusion 216 may formed such that the protruding length L1 of the outer protrusion 216 becomes longer at the inlet-side end portion 213. For example, in the case where the turbine housing 10 is attached to the exhaust manifold, since the exhaust manifold has high temperature due to the influence of the exhaust gas, the temperature of the turbine housing 10 at the inlet-side end portion 213 is also high. In such a case, the protruding length L1 of the outer protrusion 216 at the inlet-side end portion 213 is set to be equal to or greater than the thickness of the outer housing 12. Thus, a sufficient heat radiation effect can be obtained, whereby an increase in stress and resultant generation of a crack can be suppressed.

Figure 8:
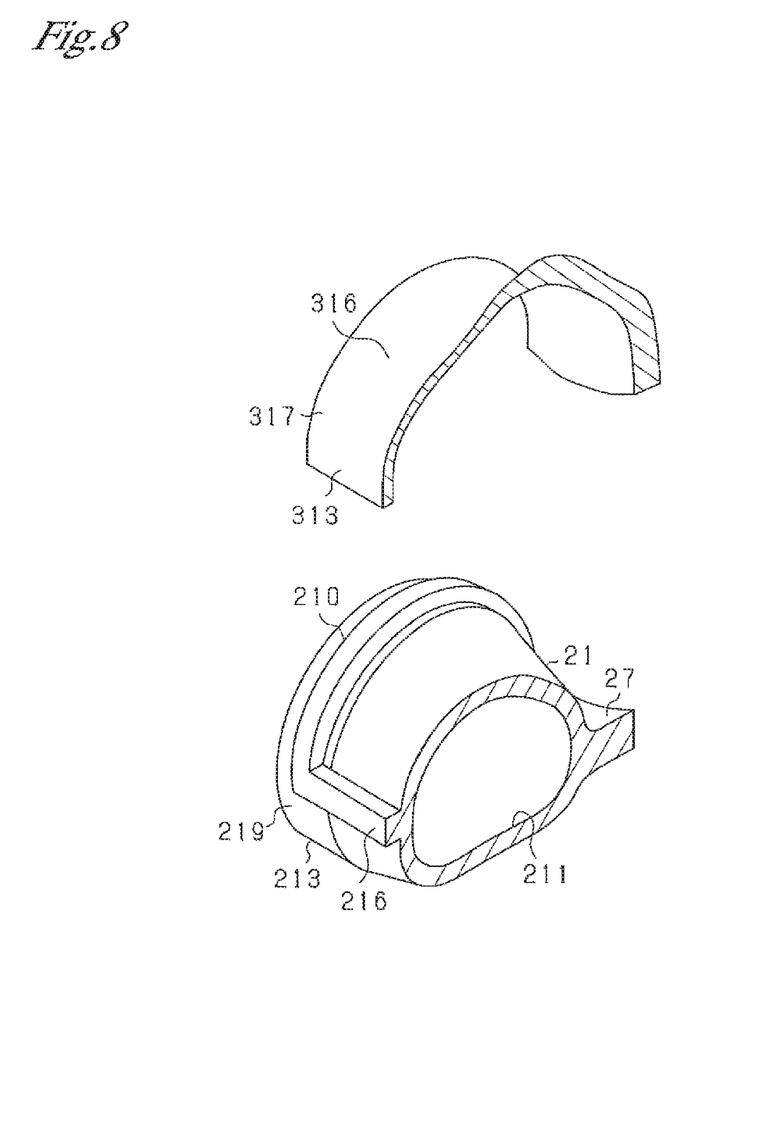
FIG. 8 is an exploded perspective view of an exhaust inlet and its vicinity in another example of the turbine housing.

Also, in the case where the temperature is high even at the inlet-side end portion 213, as shown in FIG. 8, an outer circumferential protrusion 210 may be provided on the outer circumferential portion 219 of the introduction tube portion 21. The protruding end of the outer circumferential protrusion 210 and the protruding end portion 317 of the introduction-side covering portion 316 are brought into contact with each other, and the contacted portions are joined to each other by means of welding or the like. As a result, even at the outer circumferential portion 219, the heat radiation effect by the outer circumferential protrusion 210 is obtained, whereby an excess temperature increase at the outer circumferential portion 219 of the inlet-side end portion 213 is suppressed. As a result, an increase in the stress acting on the outer circumferential portion 219 and resultant generation of a crack can be suppressed.

(c) In the above-described embodiment, the annular protrusion 227 is formed such that the protruding length L2 of the annular protrusion 227 gradually decreases from the merging portion 224 of the scroll tube portion 22 toward the downstream side. Instead of this configuration, the annular protrusion 227 may be formed such that the protruding length L2 is maintained constant over the entire annular protrusion 227. Alternatively, the annular protrusion 227 may be formed such that the protruding length L2 is maintained constant in each of the first section R1 to the third section R3 and such that the protruding length L2 in the second section R2 is shorter than the protruding length L2 in the first section R1, and the protruding length L2 in the third section R3 is shorter than the protruding length L2 in the second section R2.

(d) In the above-described embodiment, the connecting portion 27 is provided between the first side portion 215a of the introduction tube portion 21 and the outer circumferential portion 226d of the fourth section R4 of the scroll tube portion 22. Instead of providing the connecting portion 27, the inner protrusion 218 protruding from the first side portion 215a and the annular protrusion 227d protruding from the outer circumferential portion 226d may be formed individually.

(e) In the above-described embodiment, the inner housing 11 and the outer housing 12 are joined together by means of welding. Instead of this joining method, the inner housing 11 and the outer housing 12 may be joined together by means of interface bonding such as brazing.

(f) In the above-described embodiment, the turbine housing 10 used for a turbocharger for an automobile is described as an example of the turbine housing of the present disclosure. The turbine housing of the present disclosure may be applied to a turbocharger of an internal combustion engine, other than that of an automobile, such as an internal combustion engine of a ship or an aircraft.

The present disclosure has been described in conformity with examples but is not limited to the examples and the structures therein. Further, the present disclosure encompasses a variety of variation examples and variations in the scope of equivalents of the present disclosure. In addition, a variety of combinations and forms and even other combinations and forms to which only one element or two or more elements are added fall within the scope and ideological range of the present disclosure.

What is claimed is:

1. A turbine housing comprising:
an inner housing formed by casting and including a scroll tube portion which surrounds a turbine chamber for accommodating a turbine impeller and has a scroll flow passage through which a flow exhaust gas flows circularly and goes out to the turbine chamber, and an introduction tube portion which leads an inflow exhaust gas to the scroll flow passage, and an outlet passage portion through which the flow exhaust gas flows out of the turbine chamber; and
an outer housing formed of a sheet metal and including an open end portion which surrounds an outer edge portion of the inner housing when viewed in a direction of a scroll center line and an exhaust outlet which is provided on a side opposite the open end portion and through which the flow exhaust gas flowing out of the outlet passage portion is discharged;
wherein the inner housing has a protrusion protruding outward from the outer edge portion of the inner housing, and a protruding end of the protrusion and the open end portion of the outer housing are joined to each other, whereby the outer housing and the inner housing are integrated;
the scroll flow passage has a flow passage inlet through which the flow exhaust gas flows into the scroll flow passage, and a flow passage outlet through which the flow exhaust gas flows out of the scroll flow passage, and a merging portion in which the flow exhaust gas flowing out of the scroll flow passage through the flow passage outlet merges with the flow exhaust gas flowing into the scroll flow passage through the flow passage inlet;
a protruding length of the protrusion is larger at the merging portion than that at the remaining portion of the outer edge portion; and
the protruding length of the protrusion gradually decreases from the merging portion toward a downstream side of the scroll flow passage.

2. A turbine housing according to claim 1, wherein
an inlet-side end portion of the introduction tube portion has an outer circumferential protrusion which protrudes from an outer circumferential portion of the inlet-side end portion, the outer circumferential portion extending in a circumferential direction;

the outer housing has a contact portion which contacts a protruding end of the outer circumferential protrusion; and the protruding end of the outer circumferential protrusion and the contact portion are joined to each other.

3. A turbine housing comprising:

an inner housing formed by casting and including a scroll tube portion which surrounds a turbine chamber for accommodating a turbine impeller and has a scroll flow passage through which a flow exhaust gas flows circularly and goes out to the turbine chamber, and an introduction tube portion which leads an inflow exhaust gas to the scroll flow passage, and an outlet passage portion through which the flow exhaust gas flows out of the turbine chamber; and an outer housing formed of a sheet metal and including an open end portion which surrounds an outer edge portion of the inner housing when viewed in a direction of a scroll center line and an exhaust outlet which is provided on a side opposite the open end portion and through which the flow exhaust gas flowing out of the outlet passage portion is discharged;

wherein the inner housing has a protrusion protruding outward from the outer edge portion of the inner housing, and a protruding end of the protrusion and the open end portion of the outer housing are joined to each other, whereby the outer housing and the inner housing are integrated;

when viewed in the direction of the scroll center line, the introduction tube portion has a first introduction outer edge portion located near a downstream portion of the scroll tube portion, and a second introduction outer edge portion located on a side opposite of the first introduction outer edge portion across an introduction flow passage inside the introduction tube portion; and the protrusion provided on the first introduction outer edge portion and the protrusion provided on the downstream portion of the scroll tube portion are integrated together to provide a flat-plate-shaped connecting portion which connect the introduction tube portion and the downstream portion of the scroll tube portion.

4. A turbine housing according to claim 3, wherein the protruding length of the protrusion provided on the second introduction outer edge portion increases from an inlet-side end portion of the introduction tube portion toward the downstream side.

5. A turbine housing according to claim 3, wherein an inlet-side end portion of the introduction tube portion has an outer circumferential protrusion which protrudes from an outer circumferential portion of the inlet-side end portion, the outer circumferential portion extending in a circumferential direction;

the outer housing has a contact portion which contacts a protruding end of the outer circumferential protrusion; and the protruding end of the outer circumferential protrusion and the contact portion are joined to each other.

* * * * *